United States Patent
Melander (10) Patent No.: US 12,294,928 B2
(45) Date of Patent: May 6, 2025

(54) METHOD FOR IMPROVED HANDLING OF IP MULTIMEDIA SUBSYSTEM CALLS IN A HOME MOBILE COMMUNICATION NETWORK AND A VISITED MOBILE COMMUNICATION NETWORK

(71) Applicant: Deutsche Telekom AG, Bonn (DE)

(72) Inventor: Mari Melander, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 456 days.

(21) Appl. No.: 17/255,442

(22) PCT Filed: Jul. 3, 2019

(86) PCT No.: PCT/EP2019/067879
§ 371 (c)(1),
(2) Date: Dec. 23, 2020

(87) PCT Pub. No.: WO2020/007929
PCT Pub. Date: Jan. 9, 2020

(65) Prior Publication Data
US 2021/0258763 A1 Aug. 19, 2021

(30) Foreign Application Priority Data
Jul. 3, 2018 (EP) .................................. 18181382

(51) Int. Cl.
*H04W 4/90* (2018.01)
*H04L 65/1016* (2022.01)
(Continued)

(52) U.S. Cl.
CPC ........... *H04W 4/90* (2018.02); *H04L 65/1016* (2013.01); *H04L 65/1069* (2013.01); *H04W 76/50* (2018.02)

(58) Field of Classification Search
CPC .... H04W 4/90; H04W 76/50; H04L 65/1016; H04L 65/1069
See application file for complete search history.

(56) References Cited

U.S. PATENT DOCUMENTS 8,254,872 B2    8/2012   Liebhart
8,280,342 B1 *  10/2012  Manning ............... H04W 76/50
                                                     455/445
(Continued)

FOREIGN PATENT DOCUMENTS

CN      101123822 A     2/2008
CN      101317492 A     12/2008
(Continued)

OTHER PUBLICATIONS

3rd Generation Partnership Project, S2-162702_23167 CR0295_V8_emerg: 2858, 3GPP, Support of IMS emergency sessions for roaming users in deployments without IMS-level roaming interfaces, May 17, 2016, Nanjing, P.R. China.
(Continued)

*Primary Examiner* — Syed Ali
(74) *Attorney, Agent, or Firm* — LEYDIG, VOIT & MAYER, LTD.

(57) ABSTRACT

A method for handling of IP multimedia subsystem calls and configuration of a user equipment using a home mobile communication network includes: in a first step, an IP multimedia subsystem call parameter information or an IP multimedia subsystem emergency call parameter information is transmitted by the visited mobile communication network to the user equipment in case that the user equipment is connected to the visited mobile communication network, or an IP multimedia subsystem emergency call parameter information is transmitted by the home mobile communication network to the user equipment in case that the user equipment is connected to the home mobile com-
(Continued)

munication network; and in a second step, the user equipment-upon attempting an IP multimedia subsystem emergency call or an IP multimedia subsystem call—applies or acts according to the content of the IP multimedia subsystem call parameter information and/or of the IP multimedia subsystem emergency call parameter information.

13 Claims, 1 Drawing Sheet

(51) Int. Cl.
*H04L 65/1069* (2022.01)
*H04W 76/50* (2018.01)

(56) References Cited

U.S. PATENT DOCUMENTS

| | | | | |
|---|---|---|---|---|
| 10,912,141 | B2* | 2/2021 | Guerzoni | H04L 65/1069 |
| 12,225,444 | B2* | 2/2025 | Buckley | H04W 60/00 |
| 2009/0098851 | A1* | 4/2009 | Liebhart | H04W 4/90 370/352 |
| 2010/0014508 | A1 | 1/2010 | Yang | |
| 2010/0136967 | A1* | 6/2010 | Du | H04W 8/205 455/432.1 |
| 2013/0095828 | A1* | 4/2013 | Hursey | H04W 8/04 455/433 |
| 2013/0178186 | A1* | 7/2013 | Mueller | H04W 4/90 455/404.2 |
| 2015/0319594 | A1* | 11/2015 | Li | H04M 15/8083 455/406 |
| 2016/0295386 | A1* | 10/2016 | Faccin | H04W 4/029 |
| 2017/0055141 | A1 | 2/2017 | Kim et al. | |
| 2017/0374107 | A1* | 12/2017 | Lauster | H04W 4/90 |
| 2018/0049010 | A1* | 2/2018 | Lauster | H04W 76/12 |
| 2018/0191786 | A1* | 7/2018 | Kunz | H04W 8/12 |
| 2018/0213384 | A1* | 7/2018 | Youn | H04W 4/90 |
| 2018/0359662 | A1* | 12/2018 | Kim | H04W 36/0011 |
| 2019/0037518 | A1* | 1/2019 | Russell | H04L 65/1016 |
| 2019/0089840 | A1* | 3/2019 | Amin | H04L 65/1096 |
| 2019/0098692 | A1* | 3/2019 | Atarius | H04L 65/1069 |
| 2019/0208393 | A1* | 7/2019 | Bakker | H04L 65/1016 |
| 2019/0364466 | A1* | 11/2019 | Doree | H04L 67/146 |
| 2019/0380024 | A1* | 12/2019 | Gu | H04W 8/183 |
| 2019/0387030 | A1* | 12/2019 | Sridhar | H04L 65/1069 |
| 2020/0100202 | A1* | 3/2020 | Bakker | H04W 8/18 |
| 2020/0119984 | A1* | 4/2020 | Bouvet | H04L 65/1073 |
| 2020/0404479 | A1* | 12/2020 | Lee | H04W 60/00 |
| 2021/0219122 | A1* | 7/2021 | Buckley | H04W 60/00 |

FOREIGN PATENT DOCUMENTS

| | | |
|---|---|---|
| CN | 101577882 A | 11/2009 |
| CN | 107231621 A | 10/2017 |

OTHER PUBLICATIONS

3rd Generation Partnership Project, TR 23.749 V2.0.0, 3GPP, Technical Specification Group Services and System Aspects, Study on S8 Home Routing Architecture for VoLTE, Release 14, Jun. 15, 2016, Valbonne, France.

* cited by examiner

METHOD FOR IMPROVED HANDLING OF IP MULTIMEDIA SUBSYSTEM CALLS IN A HOME MOBILE COMMUNICATION NETWORK AND A VISITED MOBILE COMMUNICATION NETWORK

CROSS-REFERENCE TO PRIOR APPLICATIONS

This application is a U.S. National Phase Application under 35 U.S.C. § 371 of International Application No. PCT/EP2019/067879, filed on Jul. 3, 2019, and claims benefit to European Patent Application No. EP 18181382.5, filed on Jul. 3, 2018. The International Application was published in English on Jan. 9, 2020 as WO 2020/007929 A1 under PCT Article 21 (2).

FIELD

The present invention relates to a method for improved handling of Internet Protocol (IP) multimedia subsystem calls and configuration of a user equipment using a home mobile communication network in the situation that either
- the user equipment attempts or is able to attempt an IP multimedia subsystem emergency call or an IP multimedia subsystem call, and the user equipment being connected to a visited mobile communication network via a radio access network of or associated with the visited mobile communication network, or
- the user equipment attempts or is able to attempt an IP multimedia subsystem emergency call, the user equipment being connected to the home mobile communication network via a radio access network of or associated with the home mobile communication network.

Furthermore, the present invention relates to a system for improved handling of IP multimedia subsystem calls and configuration of a user equipment using a home mobile communication network in the situation that either
- the user equipment attempts or is able to attempt an IP multimedia subsystem emergency call or an IP multimedia subsystem call, and the user equipment being connected to a visited mobile communication network via a radio access network of or associated with the visited mobile communication network, or
- the user equipment attempts or is able to attempt an IP multimedia subsystem emergency call, the user equipment being connected to the home mobile communication network via a radio access network of or associated with the home mobile communication network.

Additionally, the present invention relates to a mobile communication network for improved handling of IP multimedia subsystem calls and configuration of a user equipment, wherein the mobile communication network is acting as a home mobile communication network of the user equipment in the situation that the user equipment attempts or is able to attempt an IP multimedia subsystem emergency call, and the user equipment being connected to the home mobile communication network via a radio access network of or associated with the home mobile communication network.

Additionally, the present invention relates to a mobile communication network for improved handling of IP multimedia subsystem calls and configuration of a user equipment, wherein the mobile communication network is acting as a visited mobile communication network of the user equipment using a home mobile communication network in the situation that the user equipment attempts or is able to attempt an IP multimedia subsystem emergency call or an IP multimedia subsystem call, and the user equipment being connected to a visited mobile communication network via a radio access network of or associated with the visited mobile communication network.

Additionally, the present invention relates to a user equipment for improved handling of IP multimedia subsystem calls and configuration of the user equipment which is using a home mobile communication network in the situation that either
- the user equipment attempts or is able to attempt an IP multimedia subsystem emergency call or an IP multimedia subsystem call, and the user equipment being connected to a visited mobile communication network via a radio access network of or associated with the visited mobile communication network, or
- the user equipment attempts or is able to attempt an IP multimedia subsystem emergency call, the user equipment being connected to the home mobile communication network via a radio access network of or associated with the home mobile communication network.

Furthermore, the present invention relates to a program and to a computer-readable medium for improved handling of IP multimedia subsystem calls or IP multimedia subsystem emergency calls.

The present invention generally relates to user equipment attaching to a mobile communication network using different access methods-such as, e.g., voice over Long Term Evolution (LTE) or the like-together with IP multimedia subsystem technology in order to initiate calls, either non-emergency calls (i.e. "normal" calls) or emergency calls.

BACKGROUND

The IP multimedia subsystem technology in order to initiate calls can be used with different access technologies, such as voice over LTE. However, one major challenge—especially when using voice over LTE access methods—is the comparatively heavy fragmentation of voice over LTE deployments. This means that voice over LTE devices or user equipment (such as mobile phones, tablet computers or phablet devices, etc . . . ) need to maintain tens if not hundreds of parameters and adjust call parameter values based on the current network operator. Voice over LTE relevant parameters are defined in GSMA PRD IR.92 "IMS Profile for Voice and SMS", Version 11.0 (or Version 12.0), Annex C. These parameters can be conveyed to the user equipment (especially a voice over LTE device or user equipment) either as part of Late Customization (defined in GSMA PRD TS.32 "Technical Adaptation of Devices through Late Customization", Version 3.0), or by two alternative configuration methods, OMA DM v.1.2 (defined in OMA-ERELD-DM-V1.2 Enabler Release Definition for OMA Device Management Approved Version 1.2), and HTTP based RCS configuration (defined in GSMA PRD RCC.14, "Service Provider Device Configuration", Version 5.0).

However, such configuration methods when using different access technologies based on IP multimedia subsystem calls are typically only applied by the home operator and the parameters are only related to the home network. For example, for voice over LTE, typically different roaming models, namely local break-out and S8HR (both defined in GSMA PRD IR.65 (IMS Roaming, Interconnection and Interworking Guidelines, Version 27.0) and GSMA PRD IR.88 (LTE and EPC Roaming Guidelines, Version 16.0)), are used. However, regardless of the roaming model, the emergency calls must always be handled locally in the visited mobile communication network. Such emergency calls (e.g., voice over LTE emergency calls) will therefore have the challenge, that the user equipment must execute the procedures in the visited network, but the relevant parameters are configured according to the home network, leading, in the worst case, to failed emergency calls because of such potential parameter mismatch.

SUMMARY

In an exemplary embodiment, the present invention provides a method for handling of IP multimedia subsystem calls and configuration of a user equipment using a home mobile communication network in the situation that either the user equipment attempts or is able to attempt an IP multimedia subsystem emergency call or an IP multimedia subsystem call, and the user equipment being connected to a visited mobile communication network via a radio access network of or associated with the visited mobile communication network, or the user equipment attempts or is able to attempt an IP multimedia subsystem emergency call, the user equipment being connected to the home mobile communication network via a radio access network of or associated with the home mobile communication network. The method includes: in a first step, an IP multimedia subsystem call parameter information or an IP multimedia subsystem emergency call parameter information is transmitted by the visited mobile communication network to the user equipment in case that the user equipment is connected to the visited mobile communication network, or an IP multimedia subsystem emergency call parameter information is transmitted by the home mobile communication network to the user equipment in case that the user equipment is connected to the home mobile communication network; and in a second step, during or subsequent to the first step, the user equipment-upon attempting an IP multimedia subsystem emergency call or an IP multimedia subsystem call—applies or acts according to the content of the IP multimedia subsystem call parameter information and/or of the IP multimedia subsystem emergency call parameter information. The method further includes a third step, prior to the first step, wherein during the third step, the user equipment roams to the visited mobile communication network with IP multimedia subsystem call related parameters or IP multimedia subsystem emergency call related parameters being stored in the user equipment according to previously stored values of these IP multimedia subsystem call related parameters or IP multimedia subsystem emergency call related parameters, wherein the IP multimedia subsystem call parameter information and/or the IP multimedia subsystem emergency call parameter information comprises parameter information that are adjusted to the visited mobile communication network to which the user equipment is attached to or is attempting to be attached to, such parameter information being stored and applied-especially at least during a certain validity time interval-rather than IP multimedia subsystem call related parameters or IP multimedia subsystem emergency call related parameters being stored in the user equipment according to previously stored values of these IP multimedia subsystem call related parameters or IP multimedia subsystem emergency call related parameters.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention provide an effective and simple solution to realize improved handling of IP multimedia subsystem calls and improved configuration of a user equipment using a home mobile communication network in the situation that the user equipment attempts either an IP multimedia subsystem emergency call or a non-emergency call while connected to a visited mobile communication network, or attempts an IP multimedia subsystem emergency call while connected to the home mobile communication network.

Exemplary embodiments of the present invention provide a method for improved handling of IP multimedia subsystem calls and configuration of a user equipment using a home mobile communication network in the situation that either the user equipment attempts or is able to attempt an IP multimedia subsystem emergency call or an IP multimedia subsystem call, and the user equipment being connected to a visited mobile communication network via a radio access network of or associated with the visited mobile communication network, or the user equipment attempts or is able to attempt an IP multimedia subsystem emergency call, and the user equipment being connected to the home mobile communication network via a radio access network of or associated with the home mobile communication network, wherein the method comprises the following steps:

in a first step, IP multimedia subsystem call parameter information or IP multimedia subsystem emergency call parameter information is transmitted by the visited mobile communication network to the user equipment in case that the user equipment is connected to the visited mobile communication network, or an IP multimedia subsystem emergency call parameter information is transmitted by the home mobile communication network to the user equipment in case that the user equipment is connected to the home mobile communication network, in a second step, during or subsequent to the first step, the user equipment-upon attempting an IP multimedia subsystem emergency call or an IP multimedia subsystem call-applies or acts according to the content of the IP multimedia subsystem call parameter information and/or of the IP multimedia subsystem emergency call parameter information.

It is thereby advantageously possible according to the present invention to provide a procedure for the visited network to avoid the above mentioned potential parameter mismatch, especially via adjusting the relevant parameters for emergency calls (i.e. IP multimedia subsystem emergency calls, especially voice over LTE emergency calls) in a roaming user equipment (e.g. a voice over LTE device), i.e. by providing a mechanism such that such a potential parameter mismatch cannot occur. Furthermore, such relevant parameters for emergency calls in a roaming user equipment are defined.

Furthermore, the invention can advantageously be applied to the situation of the user equipment attempting an emergency call while attached to the home mobile communication network: In such a situation, it is advantageously possible that the emergency call setup can be configured to be simplified, i.e. all extensions and additional features that are there for IP multimedia subsystem calls (especially voice over LTE calls) in order to provide optimized user experience, could be turned off. This makes the emergency call setup more robust. Furthermore, there are also purely emergency call related features that can be parametrized via exemplary embodiment of the inventive method, e.g. some networks allow anonymous emergency calls and some not.

Additionally, the invention can advantageously be applied also to the situation of the user equipment attempting a non-emergency call (i.e. a normal IP multimedia subsystem call) while attached to a visited mobile communication network (especially when local breakout is used as the IP multimedia subsystem roaming model, especially the voice over LTE roaming model): According to this alternative, the invention is applied in general (i.e. regardless of whether the roaming user equipment is attempting an emergency call or a non-emergency call, i.e. a normal call), and in such a situation, the visited mobile communication network always configures the IP multimedia subsystem parameters (especially voice over LTE parameters) and the roaming user equipment (typically a voice over LTE user equipment) applies these parameters in general for IP multimedia subsystem calls. According to the present invention, a normal call either corresponds—according to one variant of the invention—to a normal audio call (i.e. providing at least one audio channel (and especially no additional video channel)) between the parties of the call. Furthermore according to the present invention, a normal call may also correspond—according to a further variant of the invention—to a normal video call (i.e. providing at least one audio channel and additionally at least one video channel) between the parties of the call.

Exemplary embodiments of the present invention further provide a method for improved handling of IP multimedia subsystem calls and configuration of a user equipment using a home mobile communication network in the situation that either the user equipment attempts or is able to attempt an IP multimedia subsystem emergency call or an IP multimedia subsystem call, and the user equipment being connected to a visited mobile communication network via a radio access network of or associated with the visited mobile communication network, or the user equipment attempts or is able to attempt an IP multimedia subsystem emergency call, the user equipment being connected to the home mobile communication network via a radio access network of or associated with the home mobile communication network, wherein the method comprises the following steps:

in a first step, IP multimedia subsystem call parameter information or IP multimedia subsystem emergency call parameter information is transmitted by the visited mobile communication network to the user equipment in case that the user equipment is connected to the visited mobile communication network, or IP multimedia subsystem emergency call parameter information is transmitted by the home mobile communication network to the user equipment in case that the user equipment is connected to the home mobile communication network, in a second step, during or subsequent to the first step, the user equipment-upon attempting an IP multimedia subsystem emergency call or an IP multimedia subsystem call-applies or acts according to the content of the IP multimedia subsystem call parameter information and/or of the IP multimedia subsystem emergency call parameter information, wherein the method comprises a third step, prior to the first step, wherein during the third step, the user equipment roams to the visited mobile communication network with IP multimedia subsystem call related parameters or IP multimedia subsystem emergency call related parameters being stored in the user equipment according to previously stored values of these IP multimedia subsystem call related parameters or IP multimedia subsystem emergency call related parameters, wherein the IP multimedia subsystem call parameter information and/or the IP multimedia subsystem emergency call parameter information comprises parameter information that are adjusted to the visited mobile communication network to which the user equipment is attached to or is attempting to be attached to, such parameter information being stored and applied-especially at least during a certain validity time interval-rather than IP multimedia subsystem call related parameters or IP multimedia subsystem emergency call related parameters being stored in the user equipment according to previously stored values of these IP multimedia subsystem call related parameters or IP multimedia subsystem emergency call related parameters.

It is thereby advantageously possible that the previously stored values of the IP multimedia subsystem call related parameters or IP multimedia subsystem emergency call related parameters are related to the visited mobile communication network or to another visited mobile communication network, and that, after an update of the values of such call parameters, the previously stored values of the IP multimedia subsystem call related parameters or IP multimedia subsystem emergency call related parameters are able to be applied in the visited mobile communication network (or in another visited mobile communication network), at least during a certain validity time interval of, e.g., one hour or one day or two or three days or one week or the like. This means that the stored values of the IP multimedia subsystem call related parameters or IP multimedia subsystem emergency call related parameters (stored in the user equipment) are considered correct in case that the last update has occurred within such a validity time interval.

According to the present invention, the improved handling of IP multimedia subsystem calls and improved user equipment configuration supposes that the user equipment attempts or is able to attempt an IP multimedia subsystem emergency call or an IP multimedia subsystem call, while either being connected to a visited mobile communication network (typically using a radio access network of or associated with the visited mobile communication network) or to the home mobile communication network (typically using a radio access network of or associated with the home mobile communication network). According to the present invention, in a first step, IP multimedia subsystem call parameter information or IP multimedia subsystem emergency call parameter information is transmitted by the visited mobile communication network to the user equipment in case that the user equipment is connected to the visited mobile communication network, or an IP multimedia subsystem emergency call parameter information is transmitted by the home mobile communication network to the user equipment in case that the user equipment is connected to the home mobile communication network, and in a second step, during or subsequent to the first step, the user equipment—upon attempting an IP multimedia subsystem emergency call or an IP multimedia subsystem call—applies or acts according to the content of the IP multimedia subsystem call parameter information and/or of the IP multimedia subsystem emergency call parameter information.

Hence, this principle according to the present invention is applicable both to the situation that the user equipment is connected to the visited mobile communication network or that it is connected to the (or its) home mobile communication network. Hence, the present invention relates to two different situations: (1) the user equipment being connected to the visited mobile communication network and attempting an IP multimedia subsystem call (either an emergency call or a non-emergency (or normal) call), and (2) the user equipment being connected to the (or its) home mobile communication network and attempting an IP multimedia subsystem call being an emergency call.

Hence, according to the first situation, the invention provides a method for improved handling of IP multimedia subsystem calls and configuration of a user equipment using a home mobile communication network in the situation that the user equipment attempts or is able to attempt an IP multimedia subsystem emergency call or an IP multimedia subsystem call, and the user equipment is connected to a visited mobile communication network via a radio access network of or associated with the visited mobile communication network, wherein the method comprises the following steps:

in a first step, IP multimedia subsystem call parameter information or IP multimedia subsystem emergency call parameter information is transmitted by the visited mobile communication network to the user equipment, in a second step, subsequent to the first step, the user equipment-upon attempting an IP multimedia subsystem emergency call or an IP multimedia subsystem call—applies or acts according to the content of the IP multimedia subsystem call parameter information and/or of the IP multimedia subsystem emergency call parameter information.

According to the second situation, the invention provides a method for improved handling of IP multimedia subsystem calls and configuration of a user equipment using a home mobile communication network in the situation that the user equipment attempts or is able to attempt an IP multimedia subsystem emergency call, the user equipment being connected to the home mobile communication network via a radio access network of or associated with the home mobile communication network, wherein the method comprises the following steps:

in a first step, IP multimedia subsystem emergency call parameter information is transmitted by the home mobile communication network to the user equipment, in a second step, subsequent to the first step, the user equipment-upon attempting an IP multimedia subsystem emergency call—applies or acts according to the content of the IP multimedia subsystem emergency call parameter information."

According to an exemplary embodiment of the present invention, it is preferred that (for the situation that the user equipment attempts an IP multimedia subsystem emergency call)—in the second step—the IP multimedia subsystem emergency call parameter information, received during the first step, is applied by the user equipment when performing IP multimedia subsystem emergency call procedures, especially emergency attach, IP multimedia subsystem emergency registration, IP multimedia subsystem emergency call procedure.

Analogously according to an exemplary embodiment of the present invention, it is preferred that (for the situation that the user equipment attempts an IP multimedia subsystem call, i.e. a non-emergency (or normal) call)—in the second step—the IP multimedia subsystem call parameter information, received during the first step, is applied by the user equipment when performing IP multimedia subsystem call procedures, especially access network attach, IP multimedia subsystem registration, IP multimedia subsystem call procedure.

Thereby, it is advantageously possible—for both cases, i.e. for the situation that the user equipment attempts an IP multimedia subsystem emergency call, and for the situation that the user equipment attempts an IP multimedia subsystem call, i.e. a non-emergency (or normal) call—that the correct piece or pieces of parameter information is or are used such that the corresponding IP multimedia subsystem call or IP multimedia subsystem emergency call is able to be performed sufficiently quickly and correctly.

According to a further embodiment of the present invention, it is also possible and preferred that the method comprises a third step, prior to the first step, wherein during the third step, the user equipment roams to the visited mobile communication network with IP multimedia subsystem call related parameters or IP multimedia subsystem emergency call related parameters being stored in the user equipment according to previously stored values of these IP multimedia subsystem call related parameters or IP multimedia subsystem emergency call related parameters, wherein the IP multimedia subsystem call parameter information and/or the IP multimedia subsystem emergency call parameter information comprises parameter information that are adjusted to the visited mobile communication network to which the user equipment is attached to or is attempting to be attached to, such parameter information especially being stored and applied rather than IP multimedia subsystem call related parameters or IP multimedia subsystem emergency call related parameters being stored in the user equipment according to previously stored values of these IP multimedia subsystem call related parameters or IP multimedia subsystem emergency call related parameters.

According to the present invention, it is thereby advantageously possible that the call related parameters (i.e. the IP multimedia subsystem call related parameters or IP multimedia subsystem emergency call related parameters) actually being used or applied, by the user equipment, in connection to the visited mobile communication network the user equipment is currently roaming to are those call related parameters (i.e. the IP multimedia subsystem call related parameters or IP multimedia subsystem emergency call related parameters) the user equipment receives during the first step from the corresponding visited mobile communication network. The previously stored values of such parameters (i.e. previously stored in the user equipment, prior to receiving the call related parameters, from the visited mobile communication network, in the first step) may either be preconfigured values of such parameters initially stored in the user equipment, or values of such parameters that have been received from the respective (visited) mobile communication network upon a previous attachment of the considered user equipment with the considered (visited) mobile communication network. Such previously stored values (either initially stored in the user equipment or subsequently received) are—if need be—overwritten (or partly overwritten) by the call related parameters (IP multimedia subsystem call related parameters or IP multimedia subsystem emergency call related parameters) newly received in the first step according to the present invention.

According to an exemplary embodiment of the present invention it is furthermore preferred that the previously stored values of the IP multimedia subsystem call related parameters or IP multimedia subsystem emergency call related parameters are related to the visited mobile communication network or to another visited mobile communication network, wherein especially a plurality of previously stored values of the IP multimedia subsystem call related parameters or IP multimedia subsystem emergency call related parameters, related to different visited mobile communication network are stored within the user equipment.

According to the present invention, it is thereby advantageously possible that, after an update of the values of such call parameters, the previously stored values of the IP multimedia subsystem call related parameters or IP multimedia subsystem emergency call related parameters are able to be applied in the visited mobile communication network or in another visited mobile communication network, at least during a certain validity time interval of, e.g., one hour or one day or two or three days or one week or the like. This means that the stored values of the IP multimedia subsystem call related parameters or IP multimedia subsystem emergency call related parameters (stored in the user equipment) are considered correct in case that the last update has occurred within such a validity time interval. Additionally, it is advantageously possible that a plurality of previously stored values of the IP multimedia subsystem call related parameters or IP multimedia subsystem emergency call related parameters—such a plurality of stored values being related to different visited mobile communication networks—are stored within the user equipment, e.g. in a list of, for example, three or five or 10 different sets of such stored parameters (i.e. for three, or five or 10 different visited mobile communication networks). This makes it possible to perform the first step once during a validity time interval (in order to have the corresponding stored values of the IP multimedia subsystem call related parameters or IP multimedia subsystem emergency call related parameters up to date), and then to use the list (or the plurality of previously stored values) of up to date values corresponding to specific visited mobile communication networks. This is especially advantageous in case that the user equipment frequently roams within a rather static set of different mobile communication networks (such as, e.g., three or five or 10 different mobile communication networks) which are typically contacted during a certain time period of typically user equipment usage.

According to a further preferred embodiment of the present invention, the IP multimedia subsystem emergency call parameter information, provided by the home mobile communication network, corresponds to a set of emergency call relevant parameters that are either stored in the user equipment or transmitted to the user equipment via a configuration protocol.

Thereby, it is advantageously possible according to the present invention also the home mobile communication network transmits emergency call related parameters to the user equipment according to a transmission according to the first step.

According to a further preferred embodiment of the present invention, the IP multimedia subsystem call parameter information and/or the IP multimedia subsystem emergency call parameter information relates either to different management objects or to only one management object, especially a management object or management objects according to or being 3GPP IP multimedia subsystem management object(s). Throughout the present disclosure, the term management object or management objects is used to especially relate to a management object or management objects according to or being 3GPP IP multimedia subsystem management object(s).

According to the present invention it is furthermore preferred that the IP multimedia subsystem call parameter information and/or the IP multimedia subsystem emergency call parameter information is transmitted to the user equipment via at least one out of the following transport protocols:
  rich communication services (RCS) configuration, especially based on the hypertext transfer protocol, and especially using a fully qualified domain name,
  open mobile alliance device management (OMA DM), especially based on the hypertext transfer protocol, and especially using a fully qualified domain name,
  via an extended LTE attach procedure,
  via an extended IP multimedia subsystem emergency registration procedure, especially via transmitting one or a plurality of management objects as part of an extended markup language body of a session initiation protocol message,
  via a dedicated protocol specifically used for transmitting the IP multimedia subsystem call parameter information and/or the IP multimedia subsystem emergency call parameter information.

According to the present invention, it is thereby advantageously possible that the IP multimedia subsystem call parameter information and/or the IP multimedia subsystem emergency call parameter information is transmitted in an effective and reliable manner.

Furthermore, the present invention relates to a system for improved handling of IP multimedia subsystem calls and configuration of a user equipment using a home mobile communication network in the situation that either
  the user equipment attempts or is able to attempt an IP multimedia subsystem emergency call or an IP multimedia subsystem call, and the user equipment being connected to a visited mobile communication network via a radio access network of or associated with the visited mobile communication network, or
  the user equipment attempts or is able to attempt an IP multimedia subsystem emergency call, and the user equipment being connected to the home mobile communication network via a radio access network of or associated with the home mobile communication network, wherein the system comprises the user equipment and the home mobile communication network, and, if applicable, the visited mobile communication network, wherein the system is configured such that:
IP multimedia subsystem call parameter information or IP multimedia subsystem emergency call parameter information is transmitted by the visited mobile communication network to the user equipment in case that the user equipment is connected to the visited mobile communication network, or IP multimedia subsystem emergency call parameter information is transmitted by the home mobile communication network to the user equipment in case that the user equipment is connected to the home mobile communication network, the user equipment-upon attempting an IP multimedia subsystem emergency call and/or an IP multimedia subsystem call—applies or acts according to the content of the IP multimedia subsystem call parameter information and/or of the IP multimedia subsystem emergency call parameter information.

Furthermore, the present invention also relates to a system for improved handling of IP multimedia subsystem calls and configuration of a user equipment using a home mobile communication network in the situation that either the user equipment attempts or is able to attempt an IP multimedia subsystem emergency call or an IP multimedia subsystem call, and the user equipment being connected to a visited mobile communication network via a radio access network of or associated with the visited mobile communication network, or the user equipment attempts or is able to attempt an IP multimedia subsystem emergency call, the user equipment being connected to the home mobile communication network via a radio access network of or associated with the home mobile communication network, wherein the system comprises the user equipment and the home mobile communication network, and, if applicable, the visited mobile communication network, wherein the system is configured such that:

IP multimedia subsystem call parameter information or IP multimedia subsystem emergency call parameter information is transmitted by the visited mobile communication network to the user equipment in case that the user equipment is connected to the visited mobile communication network, or IP multimedia subsystem emergency call parameter information is transmitted by the home mobile communication network to the user equipment in case that the user equipment is connected to the home mobile communication network, the user equipment-upon attempting an IP multimedia subsystem emergency call and/or an IP multimedia subsystem call—applies or acts according to the content of the IP multimedia subsystem call parameter information and/or of the IP multimedia subsystem emergency call parameter information, wherein—prior to the IP multimedia subsystem call parameter information or the IP multimedia subsystem emergency call parameter information being transmitted to the user equipment—the user equipment roams to the visited mobile communication network with IP multimedia subsystem call related parameters or IP multimedia subsystem emergency call related parameters being stored in the user equipment according to previously stored values of these IP multimedia subsystem call related parameters or IP multimedia subsystem emergency call related parameters, wherein the IP multimedia subsystem call parameter information and/or the IP multimedia subsystem emergency call parameter information comprises parameter information that are adjusted to the visited mobile communication network to which the user equipment is attached to or is attempting to be attached to, such parameter information being stored and applied-especially at least during a certain validity time interval—rather than IP multimedia subsystem call related parameters or IP multimedia subsystem emergency call related parameters being stored in the user equipment according to previously stored values of these IP multimedia subsystem call related parameters or IP multimedia subsystem emergency call related parameters.

Thereby, it is advantageously possible to provide a system such that the user equipment knows about the correct IP multimedia subsystem call parameter information and/or of the IP multimedia subsystem emergency call parameter information to be applied in the respective visited mobile communication network.

Furthermore, the present invention relates to a mobile communication network for improved handling of IP multimedia subsystem calls and configuration of a user equipment, wherein the mobile communication network is acting as a home mobile communication network of the user equipment, wherein in the situation that the user equipment attempts or is able to attempt an IP multimedia subsystem emergency call, the user equipment is connected to the home mobile communication network via a radio access network of or associated with the home mobile communication network, wherein the mobile communication network is configured such that:

an IP multimedia subsystem emergency call parameter information is transmitted by the home mobile communication network to the user equipment in case that the user equipment is connected to the home mobile communication network, the user equipment-upon attempting an IP multimedia subsystem emergency call-applies or acts according to the content of the and/or of the IP multimedia subsystem emergency call parameter information.

Additionally, the present invention relates to a mobile communication network for improved handling of IP multimedia subsystem calls and configuration of a user equipment, wherein the mobile communication network is acting as a visited mobile communication network of the user equipment using a home mobile communication network, wherein in the situation that the user equipment attempts or is able to attempt an IP multimedia subsystem emergency call or an IP multimedia subsystem call, and the user equipment being connected to a visited mobile communication network via a radio access network of or associated with the visited mobile communication network, wherein the mobile communication network is configured such that:

IP multimedia subsystem call parameter information or IP multimedia subsystem emergency call parameter information is transmitted by the visited mobile communication network to the user equipment in case that the user equipment is connected to the visited mobile communication network, the user equipment-upon attempting an IP multimedia subsystem emergency call and/or an IP multimedia subsystem call—applies or acts according to the content of the IP multimedia subsystem call parameter information and/or of the IP multimedia subsystem emergency call parameter information.

Thereby, it is advantageously possible to provide a home mobile communication network or a visited mobile communication network such that the user equipment knows about the correct IP multimedia subsystem call parameter information and/or of the IP multimedia subsystem emergency call parameter information to be applied in the respective visited mobile communication network.

Furthermore, the present invention relates to a user equipment for improved handling of IP multimedia subsystem calls and configuration of the user equipment which is using a home mobile communication network in the situation that either the user equipment attempts or is able to attempt an IP multimedia subsystem emergency call or an IP multimedia subsystem call, and the user equipment being connected to a visited mobile communication network via a radio access network of or associated with the visited mobile communication network, or the user equipment attempts or is able to attempt an IP multimedia subsystem emergency call, the user equipment being connected to the home mobile communication network via a radio access network of or associated with the home mobile communication network, wherein the user equipment is configured such that:

IP multimedia subsystem call parameter information or IP multimedia subsystem emergency call parameter information is received, by the user equipment, from the visited mobile communication network in case that the user equipment is connected to the visited mobile communication network, or IP multimedia subsystem emergency call parameter information is received, by the user equipment, from the home mobile communication network in case that the user equipment is connected to the home mobile communication network, the user equipment-upon attempting an IP multimedia subsystem emergency call and/or an IP multimedia subsystem call—applies or acts according to the content of the IP multimedia subsystem call parameter information and/or of the IP multimedia subsystem emergency call parameter information.

Furthermore, the present invention additionally also relates to a user equipment for improved handling of IP multimedia subsystem calls and configuration of the user equipment which is using a home mobile communication network in the situation that either the user equipment attempts or is able to attempt an IP multimedia subsystem emergency call or an IP multimedia subsystem call, and the user equipment being connected to a visited mobile communication network via a radio access network of or associated with the visited mobile communication network, or the user equipment attempts or is able to attempt an IP multimedia subsystem emergency call, the user equipment being connected to the home mobile communication network via a radio access network of or associated with the home mobile communication network, wherein the user equipment is configured such that:

IP multimedia subsystem call parameter information or IP multimedia subsystem emergency call parameter information is received, by the user equipment, from the visited mobile communication network in case that the user equipment is connected to the visited mobile communication network, or IP multimedia subsystem emergency call parameter information is received, by the user equipment, from the home mobile communication network in case that the user equipment is connected to the home mobile communication network, the user equipment—upon attempting an IP multimedia subsystem emergency call and/or an IP multimedia subsystem call—applies or acts according to the content of the IP multimedia subsystem call parameter information and/or of the IP multimedia subsystem emergency call parameter information, wherein—prior to the IP multimedia subsystem call parameter information or the IP multimedia subsystem emergency call parameter information being received by the user equipment—the user equipment roams to the visited mobile communication network with IP multimedia subsystem call related parameters or IP multimedia subsystem emergency call related parameters being stored in the user equipment according to previously stored values of these IP multimedia subsystem call related parameters or IP multimedia subsystem emergency call related parameters, wherein the IP multimedia subsystem call parameter information and/or the IP multimedia subsystem emergency call parameter information comprises parameter information that are adjusted to the visited mobile communication network to which the user equipment is attached to or is attempting to be attached to, such parameter information being stored and applied-especially at least during a certain validity time interval-rather than IP multimedia subsystem call related parameters or IP multimedia subsystem emergency call related parameters being stored in the user equipment according to previously stored values of these IP multimedia subsystem call related parameters or IP multimedia subsystem emergency call related parameters.

Additionally, the present invention relates to a computer-readable medium and a program comprising a computer readable program code which, when executed on a computer or on a network node of a home mobile communication network or on a network node of a visited mobile communication network, or in part on the network node of the home mobile communication network and/or in part on the network node of the visited mobile communication network, causes the computer or the network node of the home mobile communication network or the network node of the visited mobile communication network to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
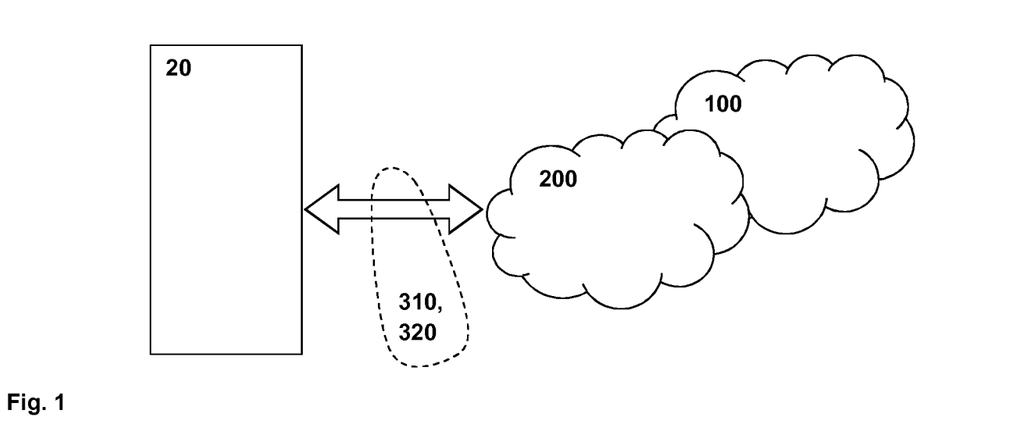
FIG. 1 schematically illustrates a home mobile communication network, a visited mobile communication network, and a user equipment according to the present invention.

In FIG. 1, a home mobile communication network 100, a visited mobile communication network 200, and a user equipment 20 according to the present invention are schematically shown. An exemplary embodiment of a corresponding inventive system comprises the user equipment 20 and the home mobile communication network 100 and/or the visited mobile communication network 200.

According to the present invention and in case that the user equipment 20 is connected to the visited mobile communication network 200, in a first step, IP multimedia subsystem call parameter information 310 or IP multimedia subsystem emergency call parameter information 320 is transmitted by the visited mobile communication network 200 to the user equipment 20.

In a second step, during or subsequent to the first step, the user equipment 20—upon attempting an IP multimedia subsystem emergency call or an IP multimedia subsystem call-applies or acts according to the content of the IP multimedia subsystem call parameter information 310 and/or of the IP multimedia subsystem emergency call parameter information 320. Hence, when the user equipment 20 is roaming in a visited mobile communication network 200 that supports IP multimedia subsystem calls, the visited mobile communication network 200 transports to the IP multimedia subsystem call enabled user equipment 20 the IP multimedia subsystem emergency call relevant parameters with the values adjusted to this particular visited mobile communication network 200. The user equipment 20 then applies these parameters when performing IP multimedia subsystem call emergency procedures (especially voice over LTE emergency procedures), i.e. emergency attach, emergency registration and emergency call, as defined in GSMA PRD IR.92, 3GPP TS 24.229, 3GPP TS 23.167 and 3GPP TS 24.301. In case this is also applied to non-emergency calls, the visited mobile communication network 200 always configures the IP multimedia subsystem call parameters (i.e. the IP multimedia subsystem call parameter information 310 and/or of the IP multimedia subsystem emergency call parameter information 320) and the IP multimedia subsystem call enables user equipment 20, especially voice over LTE user equipment 20) applies them for such calls. Typically, this makes sense in connection with a local breakout roaming model.

Figure 2:
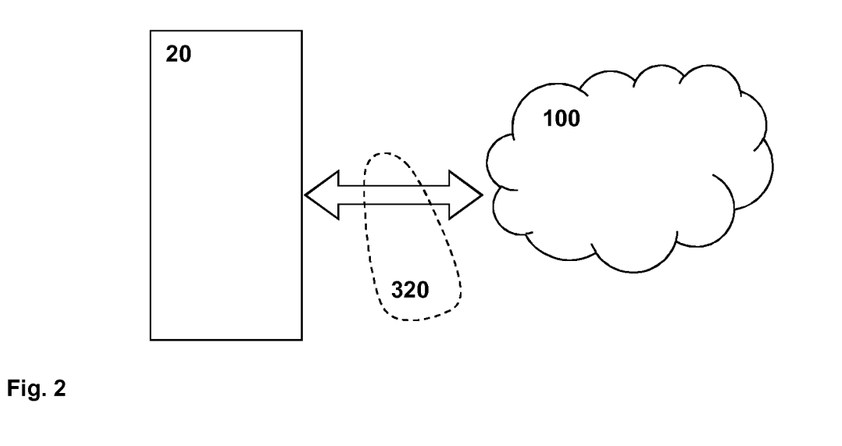
FIG. 2 schematically illustrates a home mobile communication network and a user equipment according to the present invention.

In FIG. 2, a home mobile communication network 100, and a user equipment 20 according to the present invention are schematically shown. An exemplary embodiment of a corresponding inventive system comprises the user equipment 20 and the home mobile communication network 100.

According to the present invention and in case that the user equipment 20 is connected to the home mobile communication network 100, in a first step, IP multimedia subsystem emergency call parameter information 320 is transmitted by the home mobile communication network 100 to the user equipment 20.

In a second step, during or subsequent to the first step, the user equipment 20—upon attempting an IP multimedia subsystem emergency call or an IP multimedia subsystem call-applies or acts according to the content of the IP multimedia subsystem emergency call parameter information 320. According to such a use of the invention in the home mobile communication network 100, a set of emergency call relevant parameters are either stored in the user equipment 20 or transported to the user equipment 20 via a configuration protocol. The user equipment 20 then applies these parameters when performing IP multimedia subsystem emergency call procedures, i.e. emergency attach, emergency registration and emergency call, as defined in GSMA PRD IR.92, 3GPP TS 24.229, 3GPP TS 23.167 and 3GPP TS 24.301; in such a situation, there is the benefit that the emergency call setup is able to be configured in a simplified manner, i.e. all extensions and additional features that are there for IP multimedia subsystem calls in order to provide optimized user experience, can be turned off, which makes the emergency call setup more robust.

More specifically, the first and second steps of an exemplary embodiment of the inventive method are performed via transmitting the IP multimedia subsystem call parameter information 310 and/or of the IP multimedia subsystem emergency call parameter information 320 during an attach procedure (e.g. LTE attach) triggered, e.g., by voice over PS supported indication or an emergency call indication).

In a first processing step, the user equipment 20 roams to the visited network 200. The emergency call related parameters (i.e. the IP multimedia subsystem emergency call parameter information 320) and/or the non-emergency call related parameters (i.e. the IP multimedia subsystem call parameter information 310) are stored in the user equipment 20 with their home network default values. In a second processing step, the user equipment 20 receives the indication during an attach procedure (such as LTE attach in the LTE case), if voice over PS is supported and/or if emergency services are supported. This triggers the procedure to receive the IP multimedia subsystem (emergency) call parameter values (i.e. the IP multimedia subsystem call parameter information 310 and/or of the IP multimedia subsystem emergency call parameter information 320) from the visited mobile communication network 200 in a third processing step (i.e. the first step of an exemplary embodiment of the inventive method). In case the IP multimedia subsystem enabled user equipment 20 receives the parameters (i.e. the IP multimedia subsystem call parameter information 310 and/or of the IP multimedia subsystem emergency call parameter information 320) in a fourth processing step, it applies the received values in the future for the emergency procedures (or for non-emergency procedures) in a fifth processing step. In case the IP multimedia subsystem enabled user equipment 20 does not receive the parameters, the default parameters are applied in a sixth processing step.

The same processing steps are also applicable in case that the user equipment 20 is connected to the home mobile communication network 100 rather than to the visited mobile communication network 200. In this case, late customization could be applied to store the home network default values in the user equipment 20.

In case non-emergency IP multimedia subsystem calls are also concerned, the third processing step would be triggered by the voice over PS indication, regardless of any emergency service support indication in the second processing step.

According to the present invention, a certain number of IP multimedia subsystem emergency call relevant parameters (i.e. the IP multimedia subsystem emergency call parameter information 320) and/or a certain number of non-emergency call related parameters (i.e. the IP multimedia subsystem call parameter information 310)—are able to be modified by the visited mobile communication network 200. Besides the one purely emergency call related parameter ("Anonymous Emergency Call Allowed" with possible values of 0=not allowed, and 1=allowed) which should—according to the present invention—be altered (if applicable), by the visited mobile communication network 200, at least one other emergency call relevant parameter (or a plurality of other emergency call relevant parameters) may be accessible to be adjusted by the visited mobile communication network 200 or by the home mobile communication network 100.

As an example, one or a plurality of the following parameters (especially of the voice over LTE configuration parameters from GSMA PRD IR.92 Table C.3.1) are able to be modified by the home mobile communication network 100 or by the visited mobile communication network 200 according to the present invention. In the following, a first variant of these parameters (to be transmitted to the user equipment 20 in the second step) are specifically discussed with regard to the call being either an emergency audio-only call—in either the home mobile communication network or in the visited mobile communication network—or the call being an emergency video call-likewise in either the home mobile communication network or in the visited mobile communication network. The home network default values—as defined in IR.92 and typically used or as used in a typical implementation in a home mobile communication network—of the different parameters are indicated as well as the values of the different parameters as suggested to be used according to the present invention (in either the home mobile communication network or the visited mobile communication network):

the parameter "IMS" (i.e. the use of the IP multimedia subsystem) is enabled both in the default case and as suggested according to the present invention in case the call is an emergency audio-only call, or an emergency video call, the parameter "Media_type_restriction_policy (Voice and/or Video over LTE allowed)" is normally (or according to home network default values) set to "Voice only allowed"; according to the present invention, it is set to "Voice only allowed" in case the call is an emergency audio-only call, and it is set to "Voice and video allowed" in case the call is an emergency video call, the parameter "SMSoIP_usage_policy (When to use SMSoIP)" is normally (or according to home network default values) set to "2-SMSoIP irrespective of IMS voice support"; according to the present invention, it is likewise set to "2-SMSoIP irrespective of IMS voice support" in case the call is an emergency audio-only call, or an emergency video call, the parameter "RegRetryBaseTime" is normally (or according to home network default values) set to "30 seconds"; according to the present invention, it is likewise set to "30s" in case the call is an emergency audio-only call, or an emergency video call, the parameter "RegRetryMaxTime" is normally (or according to home network default values) set to "300 seconds"; according to the present invention, it is likewise set to "300s" in case the call is an emergency audio-only call, or an emergency video call, the parameter "Policy_on_local_numbers (Local number type for voice and video calls)" is normally (or according to home network default values) set to "Home-local number" (for normal calls, i.e. for non-emergency calls); according to the present invention, it is not applicable in case the call is an emergency (audio-only or video) call, the parameter "Timer T1" is normally (or according to home network default values) set to "2 seconds"; according to the present invention, it is set to "2 s" in case the call is an emergency audio-only call, or an emergency video call, the parameter "Timer T2" is normally (or according to home network default values) set to "16 seconds"; according to the present invention, it is set to "16 s" in case the call is an emergency audio-only call, or an emergency video call, the parameter "Timer T4" is normally (or according to home network default values) set to "17 seconds"; according to the present invention, it is set to "17 s" in case the call is an emergency audio-only call, or an emergency video call, the parameter "Reliable 18× policy (Sending SIP 18× reliably)" is normally (or according to home network default values) set to "Send 18× reliably"; according to the present invention, it is set to "0" in case the call is an emergency audio-only call, or an emergency video call (a value of "0" respectively indicating that the SIP 18× responses (other than SIP 183 response) are to be sent unreliably), the parameter "FromPreferred (Use contents of FROM header if P-A-I is not present for incoming voice and video calls)" is normally (or according to home network default values) set to "Prohibit"; according to the present invention, it is not applicable in case the call is an emergency (audio-only or video) call (due to relevant for incoming calls, and, hence, no emergency calls), the parameter "Precondition_disabling_policy (SIP Preconditions used)" is normally (or according to home network default values) set to "0" (indicating that the user equipment is allowed to use the precondition mechanism); according to the present invention, it is set to "1" (indicating that the user equipment is not allowed to use the precondition mechanism) in case the call is an emergency audio-only call, or an emergency video call, the parameter "Default_EPS_bearer_context_usage_restriction_policy (Media on default (QCI=5) bearer)" is normally (or according to home network default values) set to "Prohibit"; according to the present invention, it is set to "Prohibit" in case the call is an emergency audio-only call, or an emergency video call, the parameter "RateSet for AMR" is normally (or according to home network default values) set to "0, 2, 4, 7 ("mode-set=0, 2, 4, 7" included in the SDP answer)"; according to the present invention, it is set to "0, 2, 4, 7" in case the call is an emergency audio-only call, or an emergency video call, the parameter "RateSet for AMR-WB" is normally (or according to home network default values) set to "Undefined (no mode-set parameter included in the SDP answer)"; according to the present invention, it is set to "Undefined" in case the call is an emergency audio-only call, or an emergency video call, the parameter "EVS/Br" is normally (or according to home network default values) set to "5.9-13.2"; according to the present invention, it is set to "5.9-13.2" in case the call is an emergency audio-only call, or an emergency video call, the parameter "EVS/Bw" is normally (or according to home network default values) set to "nb-swb"; according to the present invention, it is set to "nb-swb" in case the call is an emergency audio-only call, or an emergency video call, the parameter "ICM/INIT_PARTIAL_REDUNDANCY_OFFSET_RECV" is normally (or according to home network default values) set to "undefined" (ch-aw-recv not included in SDP offer); according to the present invention, it is set to "undefined" in case the call is an emergency audio-only call, or an emergency video call, the parameter "EPS_initial_attach_ConRefs (APN in initial attach)" is normally (or according to home network default values) set to "No APN"; according to the present invention, it is set to "No APN" in case the call is an emergency audio-only call, or an emergency video call, the parameter "MMTEL_voice_exempt" is normally (or according to home network default values) set to "1" (indicating that the MMTEL voice is a 3GPP PS data off exempt service); according to the present invention, it is set to "1" in case the call is an emergency audio-only call, or an emergency video call, the parameter "SMS_Over_IP_Networks_Indication" is normally (or according to home network default values) set to "1" (indicating that the SMS service is preferred to be invoked over the IP networks); according to the present invention, it is set to "0" (indicating that the SMS service is not to be invoked over the IP networks) in case the call is an emergency audio-only call, or an emergency video call, the parameter "Device_management_over_PS" is normally (or according to home network default values) set to "1" (indicating that the device management over PS is a 3GPP PS data off exempt service); according to the present invention, it is not applicable in case the call is an emergency (audio-only or video) call, the parameter "USSI_exempt" is normally (or according to home network default values) set to "1" (indicating that USSI is a 3GPP PS data off exempt service); according to the present invention, it is not applicable in case the call is an emergency audio-only call, or an emergency video call.

As a summary, only a subset of all voice over LTE parameters are relevant for emergency calls, the home network default values are adjusted, by the visited mobile communication network 200 (or by the home mobile communication network 100), especially for the context of emergency calls.

As a further example, one or a plurality of the following parameters (especially of the voice over LTE configuration parameters from GSMA PRD IR.92 Table C.3.1) are able to be modified, by the visited mobile communication network 200, according to the present invention. In the following, a second variant of these parameters (to be transmitted to the user equipment 20 in the second step) are specifically discussed with regard to the call being either a normal audio-only call in the visited mobile communication network or the call being a normal video call in the visited mobile communication network. The home network default values—as defined in IR.92 and typically used or as used in a typical implementation in a home mobile communication network—of the different parameters are indicated as well as the values of the different parameters as suggested to be used according to the present invention (in the visited mobile communication network):

the parameter "IMS" (i.e. the use of the IP multimedia subsystem) is enabled both in the default case and as suggested according to the present invention in case the call is a normal audio-only call, or a normal video call, the parameter "Media_type_restriction_policy (Voice and/or Video over LTE allowed)" is normally (or according to home network default values) set to "Voice only allowed"/"Voice and video allowed" (depending on whether the call is a voice-only or a video call); according to the present invention, it is set to "Voice only allowed" in case the call is a normal audio-only call, and it is set to "Voice and video allowed" in case the call is a normal video call, the parameter "SMSoIP_usage_policy (When to use SMSoIP)" is normally (or according to home network default values) set to "2-SMSoIP irrespective of IMS voice support"; according to the present invention, it is not applicable in case the call is a normal audio-only call, or a normal emergency video call the parameter "RegRetryBaseTime" is normally (or according to home network default values) set to "30 seconds"; according to the present invention, it is likewise set to "30s" in case the call is an emergency audio-only call, or an emergency video call, the parameter "RegRetryMaxTime" is normally (or according to home network default values) set to "300 seconds"; according to the present invention, it is likewise set to "300s" in case the call is a normal audio-only call, or a normal video call, the parameter "Policy_on_local_numbers (Local number type for voice and video calls)" is normally (or according to home network default values) set to "Home-local number" for normal calls, i.e. for non-emergency calls; according to the present invention, it is set to "2-geo local" in case the call is a normal audio-only, or a normal video call, the parameter "Timer T1" is normally (or according to home network default values) set to "2 seconds"; according to the present invention, it is likewise set to "2 s" in case the call is a normal audio-only call, or a normal video call, the parameter "Timer T2" is normally (or according to home network default values) set to "16 seconds"; according to the present invention, it is likewise set to "16 s" in case the call is a normal audio-only call, or a normal video call, the parameter "Timer T4" is normally (or according to home network default values) set to "17 seconds"; according to the present invention, it is likewise set to "17 s" in case the call is a normal audio-only call, or a normal video call, the parameter "Reliable 18× policy (Sending SIP 18× reliably)" is normally (or according to home network default values) set to "Send 18× reliably"; according to the present invention, it is likewise set to "0" in case the call is a normal audio-only call, or a normal video call (a value of "0" respectively indicating that the SIP 18× responses (other than SIP 183 response) are to be sent unreliably), the parameter "FromPreferred (Use contents of FROM header if P-A-I is not present for incoming voice and video calls)" is normally (or according to home network default values) set to "Prohibit"; according to the present invention, it is set to "0" (indicating that the from header field is not used for determination of the originating party identity in OIP service) in case the call is a normal audio-only call, or a normal video call, the parameter "Precondition_disabling_policy (SIP Preconditions used)" is normally (or according to home network default values) set to "0" (indicating that the user equipment is allowed to use the precondition mechanism); according to the present invention, it is set to "1" (indicating that the user equipment is not allowed to use the precondition mechanism) in case the call is a normal audio-only call, or a normal video call, the parameter "Default_EPS_bearer_context_usage_restriction_policy (Media on default (QCI=5) bearer)" is normally (or according to home network default values) set to "Prohibit"; according to the present invention, it is likewise set to "Prohibit" in case the call is a normal audio-only call, or a normal video call, the parameter "RateSet for AMR" is normally (or according to home network default values) set to "0, 2, 4, 7 ("mode-set=0, 2, 4, 7" included in the SDP answer)"; according to the present invention, it is likewise set to "0, 2, 4, 7" in case the call is a normal audio-only call, or a normal video call, the parameter "RateSet for AMR-WB" is normally (or according to home network default values) set to "Undefined (no mode-set parameter included in the SDP answer)"; according to the present invention, it is likewise set to "Undefined" in case the call is a normal audio-only call, or a normal video call, the parameter "EVS/Br" is normally (or according to home network default values) set to "5.9-13.2"; according to the present invention, it is likewise set to "5.9-13.2" in case the call is a normal audio-only call, or a normal video call, the parameter "EVS/Bw" is normally (or according to home network default values) set to "nb-swb"; according to the present invention, it is likewise set to "nb-swb" in case the call is a normal audio-only call, or a normal video call, the parameter "ICM/INIT_PARTIAL REDUNDANCY_OFFSET_RECV" is normally (or according to home network default values) set to "undefined" (ch-aw-recv not included in SDP offer); according to the present invention, it is likewise set to "undefined" in case the call is a normal audio-only call, or a normal video call, the parameter "EPS_initial_attach_ConRefs (APN in initial attach)" is normally (or according to home network default values) set to "No APN"; according to the present invention, it is likewise set to "No APN" in case the call is a normal audio-only call, or a normal video call, the parameter "MMTEL_voice_exempt" is normally (or according to home network default values) set to "1" (indicating that the MMTEL voice is a 3GPP PS data off exempt service); according to the present invention, it is likewise set to "1" in case the call is a normal audio-only call, or a normal video call, the parameter "SMS_Over_IP_Networks_Indication" is normally (or according to home network default values) set to "1" (indicating that the SMS service is preferred to be invoked over the IP networks); according to the present invention, it is not applicable in case the call is a normal audio-only call or a normal video call the parameter "Device_management_over_PS" is normally (or according to home network default values) set to "1" (indicating that the device management over PS is a 3GPP PS data off exempt service); according to the present invention, it is likewise set to "1" in case the call is a normal audio-only call, or a normal video call, the parameter "USSI_exempt" is normally (or according to home network default values) set to "1" (indicating that USSI is a 3GPP PS data off exempt service); according to the present invention, it is set to "1" in case the call is a normal audio-only call, or a normal video call.

As a summary, only a subset of all voice over LTE parameters are relevant for emergency call, the home network default values are adjusted, by the visited mobile communication network 200, especially for the context of normal calls.

The parameters to be transmitted to the user equipment 20 in the second step can be of different Management Objects. These parameters could be transported separately, or a new Management Object can be created for the transmission in the first step, i.e. for the transmission of the IP multimedia subsystem call parameter information 310 and/or of the IP multimedia subsystem emergency call parameter information 320.

According to the present invention, there are several possibilities or alternatives to transport the parameters or parameter information from the visited mobile communication network 200 to the roaming user equipment 20 (or from the home mobile communication network 100 to the non-roaming user equipment 20):

1) HTTP based RCS configuration defined in GSMA PRD RCC.14. This requires packet connection and for that the emergency PDN connection, see TS 24.301, could be used, i.e. temporarily opened for the parameter transportation. For the configuration server address, a FQDN (Fully Qualified Domain Name) could be standardized, e.g. config.emergency.mnc<MNC>.mcc<MCC>.pub.3gppnetwork.org.

2) OMA DM v.1.2, logically similar to the first alternative but using a different protocol.

3) Extend the IP multimedia subsystem attach procedures (especially the LTE attach procedures), see 3GPP TS 24.301, and transport the parameters similarly as local emergency call numbers are transported. This typically only makes sense, if a comparatively short parameter list is to be transmitted; the above mentioned third processing step (Get VOLTE emergency parameters from visited network) would in this case happen during the attach process (especially the LTE attach process), i.e. in the first and second processing steps.

4) Extend the emergency registration procedures and transport the Management Object MO in an XML body of a SIP message, e.g. 200 OK to REGISTER, hence the third processing step (Get VOLTE emergency parameters from visited network) would in this case happen during Emergency procedures the fifth processing step during which the received values are applied in an emergency procedure.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling of IP multimedia subsystem calls and configuration of a user equipment, wherein the method comprises:
   roaming, by the user equipment, to a visited mobile communication network, wherein the user equipment comprises previously stored IP multimedia subsystem call-related parameters from a home mobile communication network;
   receiving, by the user equipment, IP multimedia subsystem call parameter information from the visited mobile communication network, wherein the user equipment is connected to the visited mobile communication network via a radio access network associated with the visited mobile communication network, wherein the IP multimedia subsystem call parameter information comprises parameter information that is adjusted to the visited mobile communication network, and wherein the visited mobile communication network modifies the previously stored IP multimedia subsystem call-related parameters from the home mobile communication network via the IP multimedia subsystem call parameter information; and
   attempting, by the user equipment, to connect to an IP multimedia subsystem locally via the visited mobile communication network and to place an IP multimedia subsystem call, wherein upon attempting to connect to the IP multimedia subsystem and to place the IP multimedia subsystem call, the user equipment utilizes the content of the IP multimedia subsystem call parameter information rather than utilizing the previously stored IP multimedia subsystem call-related parameters;
   wherein the visited mobile communication network modifies one or more GSMA PRD IR.92 Table C.3.1 parameters of the user equipment;
   wherein the previously stored IP multimedia subsystem call-related parameters comprises previously stored IP multimedia subsystem emergency call-related parameters;
   wherein the IP multimedia subsystem call parameter information comprises IP multimedia subsystem emergency call parameter information; and
   wherein the IP multimedia subsystem call is an IP multimedia subsystem emergency call.

2. The method according to claim 1, wherein the user equipment utilizes the content of the IP multimedia subsystem call parameter information for performing IP multimedia subsystem emergency call procedures, including an emergency attach procedure, an IP multimedia subsystem emergency registration procedure, and/or an IP multimedia subsystem emergency call procedure.

3. The method according to claim 1, wherein the user equipment utilizes the content of the IP multimedia subsystem call parameter information for performing IP multimedia subsystem call procedures, including an access network attach procedure and/or an IP multimedia subsystem registration procedure.

4. The method according to claim 1, wherein the previously stored IP multimedia subsystem call-related parameters are related to multiple visited mobile communication networks.

5. The method according to claim 1, wherein the IP multimedia subsystem call parameter information relates either to different management objects or to only one management object.

6. The method according to claim 1, wherein the IP multimedia subsystem call parameter information is transmitted to the user equipment via at least one out of the following transport protocols:
   rich communication services (RCS);
   open mobile alliance device management (OMA DM);
   an extended LTE attach procedure;
   an extended emergency registration procedure; and/or
   a dedicated protocol specifically used for transmitting the IP multimedia subsystem call parameter information.

7. The method according to claim 1, wherein the user equipment utilizes the content of the IP multimedia subsystem call parameter information during a certain validity time interval.

8. The method according to claim 1, wherein the visited mobile communication network alters an IP multimedia subsystem call parameter of the user equipment regarding whether or not anonymous emergency calls are allowed.

9. The method according to claim 1, wherein the visited mobile communication network modifies one or more of the following IP multimedia subsystem call parameters of the user equipment:
   a parameter indicating whether use of the IP multimedia subsystem is enabled;
   a parameter indicating whether voice over LTE and/or video over LTE is allowed;
   a parameter indicating when to use SMS over IP;
   a parameter indicating a base wait time after an attempt to register with the IP multimedia system has failed;
   a parameter indicating a maximum wait time after an attempt to register with the IP multimedia system has failed;
   a parameter indicating a policy on local numbers;
   a parameter indicating an SIP timer T1;
   a parameter indicating an SIP timer T2;
   a parameter indicating an SIP timer T4;
   a parameter indicating whether an SIP 18x response is to be sent reliably;
   a parameter indicating an operator's originating party identity determination policy;
   a parameter indicating whether use of a precondition mechanism is allowed;
   a parameter indicating a default EPS bearer context usage restriction policy;
   a parameter indicating bit rates used by an AMR codec;
   a parameter indicating bit rates used by an AMR-WB codec;
   a parameter indicating bit rates used by an EVS codec;
   a parameter indicating an initial partial redundancy offset;
   a parameter indicating a policy on a PDN connection established during an EPS attach procedure;
   a parameter indicating whether MMTEL voice is a 3GPP PS data off exempt service;
   a parameter indicating whether to use SMS over IP;
   a parameter indicating whether device management over PS is a 3GPP PS data off exempt service; or
   a parameter indicating whether USSI is a 3GPP PS data off exempt service.

10. The method according to claim 1, wherein the user equipment attempts to connect to an IP multimedia subsystem locally via the visited mobile communication network using local breakout.

11. A system for handling of IP multimedia subsystem calls and configuration of a user equipment, wherein the system comprises:
   the user equipment; and
   the visited mobile communication network;
   wherein user equipment is configured to roam to the visited mobile communication network, wherein the user equipment comprises previously stored IP multimedia subsystem call-related parameters from a home mobile communication network;
   wherein the visited mobile communication network is configured to transmit IP multimedia subsystem call parameter information to the user equipment, wherein the user equipment is connected to the visited mobile communication network via a radio access network associated with the visited mobile communication network, wherein the IP multimedia subsystem call parameter information comprises parameter information that is adjusted to the visited mobile communication network, and wherein the visited mobile communication network modifies the previously stored IP multimedia subsystem call-related parameters from the home mobile communication network via the IP multimedia subsystem call parameter information; and
   wherein the user equipment is configured to attempt to connect to an IP multimedia subsystem locally via the visited mobile communication network and to place an IP multimedia subsystem call, and upon attempting to connect to the IP multimedia subsystem and to place the IP multimedia subsystem call, utilize the content of the IP multimedia subsystem call parameter information rather than applying or acting according to the previously stored IP multimedia subsystem call-related parameters;
   wherein the visited mobile communication network modifies one or more GSMA PRD IR.92 Table C.3.1 parameters of the user equipment;
   wherein the previously stored IP multimedia subsystem call-related parameters comprises previously stored IP multimedia subsystem emergency call-related parameters;
   wherein the IP multimedia subsystem call parameter information comprises IP multimedia subsystem emergency call parameter information; and
   wherein the IP multimedia subsystem call is an IP multimedia subsystem emergency call.

12. A user equipment for handling of IP multimedia subsystem calls and configuration of the user equipment, comprising a processor and a memory having processor-executable instructions stored thereon, wherein the processor-executable instructions, when executed by the processor, facilitate performance of the following by the user equipment:
   roaming, by the user equipment, to a visited mobile communication network, wherein the user equipment comprises previously stored IP multimedia subsystem call-related parameters from a home mobile communication network;
   receiving, by the user equipment, IP multimedia subsystem call parameter information from the visited mobile communication network, wherein the user equipment is connected to the visited mobile communication network via a radio access network associated with the visited mobile communication network, wherein the IP multimedia subsystem call parameter information comprises parameter information that is adjusted to the visited mobile communication network, and wherein the visited mobile communication network modifies the previously stored IP multimedia subsystem call-related parameters from the home mobile communication network via the IP multimedia subsystem call parameter information; and
   attempting, by the user equipment, to connect to an IP multimedia subsystem locally via the visited mobile communication network and to place an IP multimedia subsystem call, wherein upon attempting to connect to the IP multimedia subsystem and to place the IP multimedia subsystem call, the user equipment utilizes the content of the IP multimedia subsystem call parameter information rather than utilizing the previously stored IP multimedia subsystem call-related parameters;
   wherein the visited mobile communication network modifies one or more GSMA PRD IR.92 Table C.3.1 parameters of the user equipment;
   wherein the previously stored IP multimedia subsystem call-related parameters comprises previously stored IP multimedia subsystem emergency call-related parameters;
   wherein the IP multimedia subsystem call parameter information comprises IP multimedia subsystem emergency call parameter information; and
   wherein the IP multimedia subsystem call is an IP multimedia subsystem emergency call.

13. A non-transitory computer-readable medium having processor-executable instructions stored thereon, wherein the processor-executable instructions, when executed, facilitate performance of the following:
   roaming, by a user equipment, to a visited mobile communication network, wherein the user equipment comprises previously stored IP multimedia subsystem call-related parameters from a home mobile communication network;
   receiving, by the user equipment, IP multimedia subsystem call parameter information from the visited mobile communication network, wherein the user equipment is connected to the visited mobile communication network via a radio access network associated with the visited mobile communication network, wherein the IP multimedia subsystem call parameter information comprises parameter information that is adjusted to the visited mobile communication network, and wherein the visited mobile communication network modifies the previously stored IP multimedia subsystem call-related parameters from the home mobile communication network via the IP multimedia subsystem call parameter information; and
   attempting, by the user equipment, to connect to an IP multimedia subsystem locally via the visited mobile communication network and to place an IP multimedia subsystem call, wherein upon attempting to connect to the IP multimedia subsystem and to place the IP multimedia subsystem call, the user equipment utilizes the content of the IP multimedia subsystem call parameter information rather than applying or acting according to the previously stored IP multimedia subsystem call-related parameters;
   wherein the visited mobile communication network modifies one or more GSMA PRD IR.92 Table C.3.1 parameters of the user equipment;
   wherein the previously stored IP multimedia subsystem call-related parameters comprises previously stored IP multimedia subsystem emergency call-related parameters;

wherein the IP multimedia subsystem call parameter information comprises IP multimedia subsystem emergency call parameter information; and wherein the IP multimedia subsystem call is an IP multimedia subsystem emergency call.

* * * * *